Nov. 4, 1941.  E. M. SUTHERLAND  2,261,597

STORAGE BATTERY

Filed May 16, 1940

INVENTOR.
EDWIN M. SUTHERLAND
BY
Kwis Hudson & Kent
ATTORNEYS

Patented Nov. 4, 1941

2,261,597

UNITED STATES PATENT OFFICE 2,261,597

STORAGE BATTERY

Edwin M. Sutherland, East Cleveland, Ohio, assignor to Willard Storage Battery Company, Cleveland, Ohio, a corporation of West Virginia Application May 16, 1940, Serial No. 335,563

3 Claims. (Cl. 136—81)

This invention relates to storage batteries and particularly to so-called low discharge batteries which are designed for use where the current demand is low and where the battery will remain in service without attention for considerable periods of time. There are many uses for batteries of this kind, as, for example, in buoys and marine beacons of various types.

Low discharge batteries of the kind here being considered are generally provided with heavy plates few in number and are of the general type illustrated in the Dunzweiler Patents Nos. 2,042,515 and 2,046,775, the Zachlin Patent No. 2,066,663, and the Aikenhead Patent No. 2,160,806. In batteries of this kind pure lead is used in the formation of the grids, straps, and terminal posts instead of antimonial lead used in other types of batteries, this being done in view of the necessity for eliminating all foreign material which would contribute to the self-discharge of the battery.

In all types of storage batteries the positive plates are subject to growth which in a battery of the type here contemplated is very substantial. The positive plate growth is due primarily to the active material of the positive plates changing to lead sulphate, the latter occupying more space than the original material and causing the active material and the grid to expand. This may be aided also to some extent by the probable conversion of the soft lead in the grid structure to lead sulphate. The growth takes place while the battery is discharging, and although the charging of the battery will slightly reduce the size of the active material, the expanded grid of the positive plate does not shrink but retains its increased size and the next discharging continues to add growth to it.

Another problem which is present in the low discharge batteries such as here under consideration is the fact that the pure lead grid and the connecting strap are gradually affected by the electrolyte, particles of the lead probably being changed to lead sulphate during discharge, and during the charging of the battery the lead particles are changed to lead oxide. This double action gradually reduces the volume of the lead in the grid structure and eventually weakens the grid or reduces its conductivity and makes it more susceptible to breakage by reason of the forces exerted on it by the plate growth. It has been found that failures in this type of battery are in many instances caused by breakage of the positive post or breakage of the top bar of the grid frame and that these breakages are directly traceable to the forces exerted on these parts by reason of the plate growth.

It is one of the objects of the invention to provide a construction which serves to control or direct the force or pressure resulting from positive plate growth and thus overcome the breaking of terminal posts and grids from this force.

A further object is to strengthen the entire structure of the connecting straps and plates so as to more effectively resist the shocks to the battery produced by the pounding of the waves and surf on the buoy, assuming the battery is used in a buoy, as well as the jarring and jerking to which the battery may be subjected during shipping and at other times.

A still further object is to improve the connecting strap construction so as to overcome the sagging or deforming of the soft lead of the strap caused by the weight of the strap itself and the force exerted on the strap due to plate growth.

The above objects are attained very effectively by the present invention which involves a new construction of strap particularly adapted for the positive plates, an improvement in the method of connecting the plate or plates to the strap through the medium of at least two lugs instead of one, and the provision of means for interlocking the ends of the strap with the adjacent cell walls all of which serve to control and direct the force resulting from plate growth so as to reduce the bending moment and the twisting action exerted on the post and serve to brace the strap and hold the plates against motion in the container by reason of any rough treatment to which the battery may be subjected while being transported or while in use.

The above and other objects are attained by this invention which may be here briefly summarized as consisting in certain novel details of construction and combinations and arrangements of parts which will be described in the specification and set forth in the appended claims.

In the accompanying sheet of drawings wherein I have shown one embodiment of my invention, Fig. 1 is a view of a battery with the case or jar in vertical section and with the battery element as a whole shown in elevation;

Figure 1:
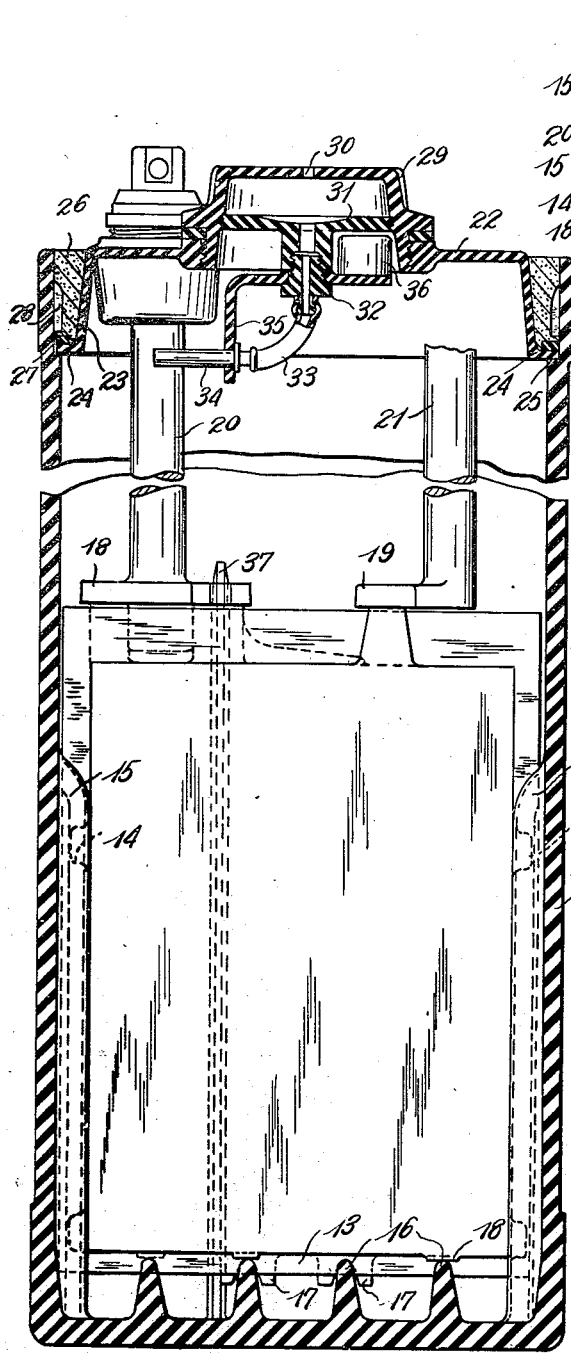

Referring now to the drawing, 10 represents the case or jar of the battery, a single cell battery being here shown, but so far as the invention is concerned, the number of cells is immaterial. The battery element is composed of positive plates 11, negative plates 12, and separators 13. As here shown, the plates are of large size and are few in number, and although my invention is obviously not limited to a battery having any given number of plates, in this instance it is provided with two positive plates 11 and three negative plates 12, the middle negative plate having the same thickness as the positive plates and the two end negative plates being one-half the thickness of the positive plates. The grid structure of the plates may follow the teachings of the Dunzweiler Patent No. 2,046,775 or the Zachlin Patent No. 2,066,663, or it may be otherwise formed. I may, if desired, use the same form of grid for the thick middle negative plate 12 as for the positive plates 11.

The plates are preferably held against lateral movement in the jar by providing on their upright edges lugs 14 which are adapted to engage vertical ribs 15 provided on the two opposite walls of the jar, as in the Dunzweiler Patent No. 2,042,515. At the bottom of the jar bottom rests 16 are provided to support the plates and the separators. I prefer to limit or prevent movement of at least the positive plates in an edgewise direction by providing on the lower edges of the plates notched lugs 17 which straddle at least one of the bottom rests 16 and if the same grid is used for the thick negative plate as is used for the positive plates, the bottom of this negative plate will have a similar notched lug 17 engaging one of the bottom rests. Generally, a single notched lug engaging one of the bottom rests and a flat lug 18 engaging another bottom rest will be sufficient for each positive plate and of course for the middle negative plate if the same type of grid is used in forming it as is used in forming the positive plates. The two relatively thin negative plates may have flat lugs engaging the bottom rests, but of course all the plates, both positive and negative, may have the notched lugs 17 to hold them against edgewise movement. Additionally, the bottom rests 16 may be notched to receive the lower portions of the separators so that they will extend below the lower edges of the plates as well as above and laterally beyond the upright or side edges of the plates, as is customary.

The positive plates are connected in a manner hereinafter described to a strap 18 which involves the principle features of the present invention, and the negative plates are connected to a strap 19. Formed integral with and extending up from the strap 18 (hereinafter referred to as the positive strap) is a positive terminal post 20, and formed integral with and extending upwardly from the strap 19 (hereinafter referred to as the negative strap) for the negative plates is a negative terminal post 21. The posts 20 and 21 extend through and may be sealed in any suitable manner in the cell cover 22.

As is customary, the cover 22 has a skirt 23 with a horizontal flange 24 at the bottom which in this instance rests upon a shoulder 25 located a suitable distance below the top of the jar. The cover is sealed by the usual sealing compound 26 and is held from movement in an upward direction by cover locking strips 27 resting on the flanges 24 beneath cover locking ribs 28 formed on the walls of the upper part of the jar, as fully described in the Pucher Patent No. 2,186,147.

It will be noted that there is considerable acid space between the battery element and the cover 22, and when the battery involving the present invention is employed in buoys or for other purposes wherein the battery may at times be supported on any of its sides, means for preventing the loss of electrolyte under these conditions is preferably employed. In this instance, I show in Fig. 1 special venting means which serves to prevent the loss of electrolyte when the battery is on its side substantially identical with that disclosed and claimed in the Aikenhead Patent No. 2,160,806, and since these features form no part of the invention, this portion of the disclosed structure will be only briefly described.

The cover will be provided with a filling opening which will be closed by a filler plug neither of which is herein illustrated. Additionally, the cover has a hollow vent plug body 29 with a vent opening 30, the body being screwed into a threaded flange of the cover. Inside the vent plug body is a transverse partition 31 provided with a central opening in which is fitted a nut or plug 32 with a passageway extending therethrough and to the lower end of this plug is fitted a flexible tube 33 with a stem or nozzle 34 extending through a downwardly extending portion of an arm 35 which is swivelled on a portion of the plug 32 and carries a weight 36 so that the free end of the nozzle 35 will always be above the level of the electrolyte no matter on which of its sides the battery may be placed.

Figure 2:
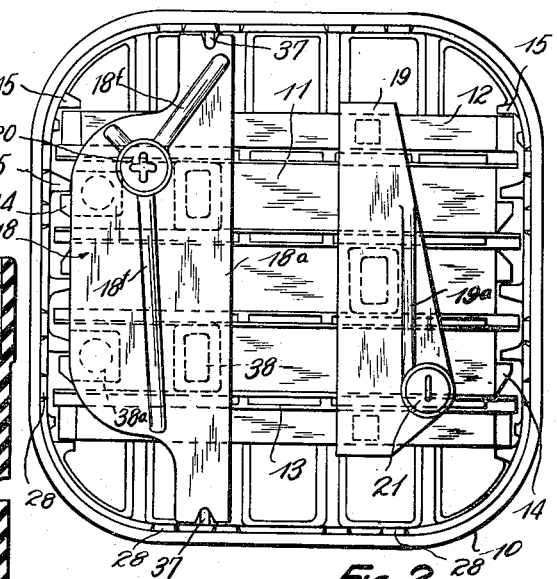
Fig. 2 is a top plan view of the same with the cover removed.
Figure 4:
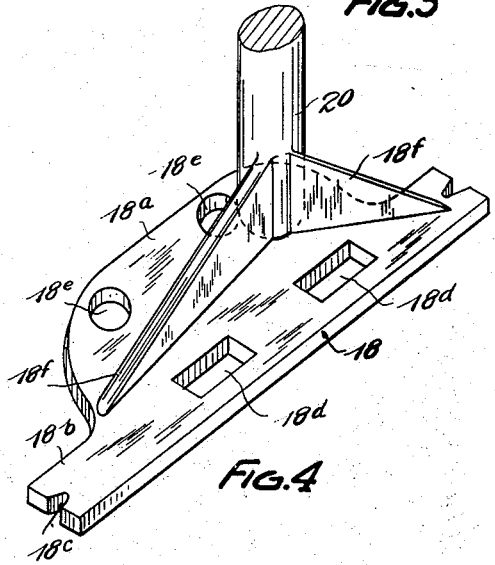
Fig. 4 is a perspective view of a strap for the positive plates with the terminal post in section.

Referring now to the features which more directly involve the present invention, it will be noted particularly by reference to Figs. 2 and 4 that I have provided a positive strap 18 of unusual and novel form. Its middle portion, designated 18a, which spans the positive plates to which it is connected is considerably wider than usual, and it has narrower end portions 18b which extend laterally beyond the battery element to or substantially to the opposite side walls of the jar 10 with which they are interlocked so as to prevent relative lateral movement between the ends of the strap and the two walls with which they are interlocked. In this instance the ends of the strap have notches 18c which embrace ribs 37 which are formed on the two opposite walls of the jar as shown, i. e., on the two opposite walls other than the two opposite walls provided with the plate holding ribs 15.

Another important feature of the invention involving the novelly formed positive strap 18 is the manner in which the positive plates are connected to the strap. It has been customary heretofore and in fact the universal practice so far as I am aware to connect each plate of a group to a strap by a single upstanding lug which is lead-burned to the strap. While this is satisfactory in batteries for most purposes, I have found that in batteries wherein the positive plate growth is excessive, as in low discharge batteries of the type here under consideration, the laterally offset relationship between the single lug connecting the positive plate to the strap and the positive terminal post results in a bending moment and a leverage action between the lug or that portion of the strap to which the lug is attached and the post, and this frequently results in breakage of the post.

This disadvantage is overcome by the present invention by providing at the top of each positive plate a plurality of lugs, preferably two, and connecting the upper ends of these two or more lugs to the strap by the usual lead-burning operation. This tends to distribute or break up the forces transmitted from the plate to the strap and hence to the post, and by arranging the lugs on opposite sides of the post there is a balancing or offsetting of the forces which heretofore have served to break or tended to break the post and also the top bar of the grid structure so that the likelihood of the post and grids being broken by the pressure or force due to excessive plate growth is avoided.

Figure 3:
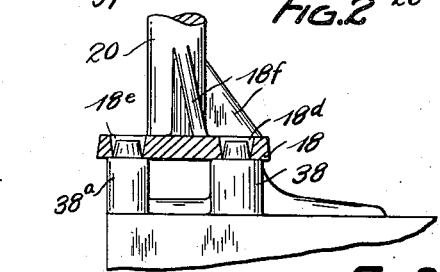
Fig. 3 is a fragmentary elevation showing a portion of one of the positive plates and the associated strap which is in section before it is lead-burned to the two lugs of the plate.

In the drawing I have shown the positive plate provided with two lugs which are designated 38 and 38a, and, as shown, these lugs have reduced upper ends which are fitted into openings 18a and 18b formed in the cast positive strap 18 and are then lead-burned to the strap. In Fig. 2 the lugs are shown by dotted lines indicating that the lead-burning operation has been performed, whereas in Fig. 3 the parts are shown before the lead-burning operation by which the lugs are intimately united with the strap. The arrangement of the lugs on the plate and the openings formed in the strap to receive the upper ends of the lugs is preferably such that the two lugs connecting the plate to the strap are on opposite sides of the terminal post 20 so that the bending moment between one lug and the terminal post will more or less offset that between the other lug and the post, thus minimizing the likelihood of twisting of the strap and breakage of the post and the upper bar of the grid structure.

As best shown in Figs. 2 and 4, the upper ends of the two lugs 38 and 38a and the openings in the strap designed to receive the upper ends of the lugs are differently shaped. The lug 38 which is the one nearest the center line of the plate is somewhat larger than the lug 38a and its upper reduced end is rectangular in shape and fits within a rectangularly shaped opening 18d of the strap. On the other hand, the somewhat smaller lug 38a has a round reduced upper end which fits into a round hole 18e of the strap. This arrangement is provided because it is believed that the stresses transmitted from the positive plate to the positive strap by the inner lug 38 are somewhat greater than the stresses transmitted by the outer lug 38a.

A further improvement which I have provided in the positive strap 18 is to overcome the sagging or deforming of the soft lead strap due to the weight of the strap itself and the force exerted against the strap due to plate growth. This is accomplished by providing bracing ribs 18f which are cast integral with the strap and post unit and which radiate from the post to different points on the strap. In this instance the upper edges of the ribs are inclined, being of gradually increasing height from their outer ends to the points where they merge with the post. Different numbers of these ribs may be provided and they are located so as to be most effective for the purpose stated, the main or longest rib extending from the post for substantially the length of the wider portion of the strap between the round and rectangular openings of each pair of openings which receive the lugs extending upwardly from each positive plate.

Inasmuch as the negative plate does not undergo plate growth to any material extent, each negative plate may be connected to the strap 19 by a single lug, and, accordingly, the strap 19 may be of more or less standard construction except that I prefer to provide it with at least one rib 19a which in this instance extends from the post in a direction generally lengthwise of the strap 19, this serving the same purpose as the ribs 18f of the positive strap.

Thus it will be seen that the objects of the invention stated in the early part of the specification are attained very effectively by the construction above described, and while I have shown the preferred construction, I do not desire to be confined to the precise arrangements or details illustrated and described but aim in my claims to cover all modifications which do not involve a departure from the spirit and scope of the invention.

Having thus described my invention, I claim:

1. In a storage battery, a container, a battery element therein including a plurality of positive plates, a strap connected to said plates, and a bottom rest for said element in the form of ribs extending upwardly from the bottom of the container, two opposite walls of said container having plate holding ribs and the other two opposite walls having strap holding ribs, said plates having at the bottom notched lugs engaging at least one of the bottom rest ribs to hold the plates against edgewise movement and having at their upright edges portions adapted to engage the first-named ribs to hold the plates against lateral movement, said strap having at its ends portions for engaging the second-named ribs to hold the strap against lateral movement relative to the container.

2. In a storage battery, a container having a cover, a battery element in the container including a plurality of plates of the same polarity, each of said plates having a pair of lugs projecting upwardly therefrom adjacent to one end thereof, and a strap extending substantially horizontally over said plates and provided with pairs of openings, the lugs of each plate extending into a pair of said openings and secured therein, said strap being provided with a terminal post projecting upwardly therefrom and extending through the cover and sealed therein and provided also on the upper side thereof with a plurality of bracing ribs extending from the post including a rib which extends across the top surface of the strap between the points of attachment of the plates to the strap.

3. In a storage battery, a container, a cover therefor, a battery element in the container including a plurality of plates of like polarity, and a strap for connecting said plates together, said strap extending substantially horizontally over the plates and provided with pairs of adjacent openings and with a terminal post extending upwardly from the strap through the cover and sealed therein, each of said plates having a pair of lugs projecting upwardly from the top edge of the plate adjacent to one end thereof and entering a pair of said openings and secured therein, said post being so located on the strap that its axis intersects the strap on a line extending lengthwise of the strap between the openings of each pair of said adjacent openings.

EDWIN M. SUTHERLAND.